United States Patent [19]

Foo et al.

[11] Patent Number: 5,372,630
[45] Date of Patent: Dec. 13, 1994

[54] DIRECT SULPHIDIZATION FUMING OF ZINC

[75] Inventors: Kevin A. Foo, Englewood, Colo.;
Rodney L. Leonard, Wembley Downes, Australia; John G. Whellock; Richard S. Celmer, both of Denver, Colo.

[73] Assignee: Mincorp Ltd, Englewood, Colo.

[21] Appl. No.: 50,455

[22] Filed: Sep. 20, 1993

[30] Foreign Application Priority Data

Nov. 14, 1990 [AU] Australia .............................. PK3335
Mar. 12, 1991 [AU] Australia .............................. PK5041

[51] Int. Cl.$^5$ ............................................. C22B 19/04
[52] U.S. Cl. ..................................... 75/654; 75/10.3; 75/659; 75/696
[58] Field of Search ................. 75/654, 659, 10.3, 484, 75/658, 696

[56] References Cited

U.S. PATENT DOCUMENTS 1,669,406  5/1928  Anderson ............................ 75/10.3
3,298,825  1/1967  Lange .................................. 75/659
4,595,574  6/1986  Matsuoka ............................ 75/659

FOREIGN PATENT DOCUMENTS

5522/31   10/1932  Australia .
66850/90  6/1991   Australia .
68934/91  6/1991   Australia .

Primary Examiner—Peter D. Rosenberg
Attorney, Agent, or Firm—Merchant, Gould, Smith, Edell, Welter & Schmidt

[57] ABSTRACT

A process for treatment of zinc sulfide or other zinc bearing feed materials in conjunction with an iron sulfide containing mineral or compound to effect a separation of zinc from iron by fuming on either zinc and sulphur vapor or zinc sulphide vapor. The vapor is stripped and transported by a carrier gas from the mineral or a molten matte formed from the mineral. The process is operated at a temperature in the region of 1250° to 1400° C. and at a partial pressure of oxygen in the region of $10^{-7}$ to $10^{-11}$ bar. The process is conducted in the presence of a liquid matte phase which contains at least iron sulphide and which is intimately mixed in a bath with a slag phase.

30 Claims, 3 Drawing Sheets

EQUILIBRIUM DIAGRAM FOR Zn-S-O AT 1300°C

EQUILIBRIUM DIAGRAM FOR Zn-S-O AT 1350°C

DIRECT SULPHIDIZATION FUMING OF ZINC

BACKGROUND OF THE INVENTION

The present invention relates to the direct sulphidization fuming of zinc and more particularly to the treatment of zinc bearing feed materials.

Zinc sulphide such as sphalerite mineral, is often the starting point for production of zinc metal or zinc oxide and conventionally it is roasted in an oxidizing environment to produce zinc oxide ZnO. The production of high grade zinc oxide from roasting is not usually possible if copper sulphide ($Cu_2S$) or iron sulphide (FeS or $FeS_2$) are present in the mineralization. In the case of iron the formation of zinc ferrite complicates the subsequent extraction by leaching of a high grade zinc oxide.

Known alternative ways of recovering zinc from sulphide minerals such as sphalerite involve the use of pressure leaching operations such as the Sherritt-Cominco process. However, these are problematic again in the presence of iron due to the formation of jarosites in the effluent. The presence of copper at any significant level also complicates subsequent extraction of zinc.

Another pyrometallurgical method of recovering zinc oxide is by fuming from slags, often derived from lead smelting operations. In this case, the zinc oxide is recovered by reducing the zinc in the slag at high temperature to zinc vapour by the addition of carbon, carbon monoxide, methane or other reducing agent to the molten slag. This process is very energy intensive and can only be applied where the zinc is present in slag as metal or oxide. An example of this type of prior art process is described in Australian Patent Applications 61527/86 (Pyrotech Resources N.L. and Ausmelt Pty Ltd).

Yet another process for generating zinc oxide pyrometallurgically makes use of the Waelz kiln in which the zinc-bearing feedstock, is passed with coke through a high temperature horizontal kiln in which reduction of the zinc oxide to zinc vapour occurs. The zinc vapour leaves the kiln and is subsequently oxidized downstream to a zinc oxide product. This process cannot produce a high quality zinc oxide due to the physical entrainment and carryover of other material with the fumed zinc.

Yet another proposed prior art process involves the treatment of lead-zinc complex sulphide ores or concentrates by a reductive fuming process. The process as proposed in Australian Patent Application AU-B-79186/87 (CSIRO) involves adding the feed to a bath of molten matte which is overlaid by a slag layer; agitating and heating the bath; and adding a reductant to the bath. The addition of a reductant to the bath is unnecessary and undesirable from the point of view of excess reagent use and handling excessive heat loads in downstream equipment. In addition the recovery rates of the CSIRO process are relatively low and operating costs high and it is not clear whether the process could be applied in the absence of significant amounts of lead.

It is well known that tin can be recovered efficiently from slags add low-grade tin concentrates by fuming using sulphidization in which sulphur is added in the form of pyrite (FeS2) to the feed material. This process is based on the extreme volatility of tin as its sulphide. It is also known that sphalerite (zinc sulphide) may be used as a sulphidizer to fume tin. However, this is not often a desirable fuming agent since tin and zinc are difficult to separate and a proportion of the zinc is found in the end product.

SUMMARY OF THE INVENTION

It is one object of the present invention to provide, in one embodiment, a novel process for the treatment of zinc sulphide or other zinc bearing feed materials which process ameliorates the aforementioned difficulties.

It is another object of the present invention to provide, in one embodiment, a process for producing zinc oxide from a zinc sulphide feed material containing other mineralization such as an iron sulphide containing mineral compound which process ameliorates the aforementioned difficulties.

The invention provides in one embodiment a process for the treatment of zinc sulphide or other zinc bearing feed material in conjunction with an iron sulphide containing mineral or compound, with the recovery of a substantially iron free zinc oxide.

It is apparent from the thermodynamic references such as Kubaschewski and Evans that information on the properties of zinc sulphide in the liquid state and gaseous state is incomplete.

It appears that the liquid state of pure zinc sulphide does not occur in the range of pressures normally employed in pyrometallurgical processing. However, it is possible to obtain liquid mattes of iron (FeS) containing significant amounts of zinc sulphide. We have now found that by maintaining an agitated matte/slag system containing iron sulphide, at sufficient temperature with the iron sulphide matte being intimately mixed in the bath with the slag phase zinc can be fumed very satisfactorily without recourse to reductant addition.

It is not clear whether the zinc sulphide that is fumed from a molten intimate mixture of matte and slag is separate zinc and sulphur vapours or a zinc sulphide combined in the vapour form. Since iron sulphide does not fume significantly itself, it is possible to make a very efficient separation of zinc from iron using this method.

The operating conditions such as temperature and partial pressure of oxygen must be maintained in order that zinc oxide which is highly infusible is not produced in the molten bath during fuming. On the other hand, it is possible to oxidize a proportion of the iron sulphide that is present either through oxygen or air from combustion or from other oxidic materials in the charge. However, it is important to maintain sufficient sulphide in the .bath to control the partial pressure of oxygen as it is .this mechanism which leads to the direct volatilisation of the zinc vapour or zinc sulphide vapour without the need for a reductive step.

By converting a proportion of the iron to its oxide some heat is liberated in the molten bath, and the presence of the FeO so formed is often beneficial for the fusibility of the slag phase which is formed in conjunction with matte on the bath.

Overall the process requires the input of energy since it is endothermic and this can be provided from a number of different sources such as coke, coal, carbon, methane, oil or other hydrocarbon fuel or even in certain instances from the partial combustion of pyrite without a carbonaceous fuel source. Unlike the roasting of zinc sulphide, however, the process is not totally exothermic but it does yield an end product in which the separation from iron is significantly better than can be achieved through the roasting process. Compared to the fuming of zinc from slags which is a reductive process, the energy requirement of this new process is substantially less.

The method for carrying out this process requires the use of a high temperature, preferably a temperature in the range of 1250° C. to 1400° C. and most preferably approximately 1300° C. The method provided by the invention further requires a gas phase (a carrier gas) which may be passed through the iron matte to effect stripping of the zinc sulphide.

The process is preferably achieved by the use of a submerged combustion system or some method of blowing through submerged tuyeres while providing adequate heat to the melt from a combustion system or other source. Various furnace options are possible for carrying out the process. These include:
1. Top feed submerged combustion lance,
2. Top fired furnace with tuyeres (side or bottom), or porous plug,
3. Rotary converter or TBRC (top blown rotary converter),
4. Electric furnace with tuyeres, lance or porous plug,
5. Plasma furnace with tuyeres, lance or porous plug.

The feed material may be in lump form, pelletized or as fines and may be introduced by being dropped into the furnace or injected through the combustion system or with a separate lance.

For a submerged combustion system, the lance itself is preferably operated in an oxygen enriched mode with at least 40% v/v oxygen in air. This reduces both the fuel consumption and the mass flow of exhaust to minimize particulate carryover. Alternatively, un-enriched air can be used.

As previously mentioned, fuels can be coke, coal, natural gas, LPG, oil or waste materials together with air (or oxygen enriched air) sufficient to provide adequate heat input to the bath to secure the range of operating temperatures required. In the absence of a fossil fuel, electrical energy could be supplied as an alternative. The oxidizing or reducing potential of the gas is more or less immaterial provided the continuous feeding of sulphide material is maintained and adequate sulphide is present in the bath to avoid oxidizing conditions. In other words the overall oxygen partial pressure is controlled by the presence of the intimately mixed matte and slag in the bath and preferably should be in the range of $10^{-7}$ to $10^{-11}$ bar.

We have found that the actual choice of operating conditions is best made on the basis of engineering considerations such as fuel consumption and the gangue and iron content of the feed material being treated. We have found that the process provided by the present invention operates satisfactorily for example with an oxygen partial pressure in the region of $10^{-8}$ bar or in the region of $10^{-9}$ bar. The final selection can be best made by optimization for the particular feed material as will be appreciated by those skilled in the art.

Any silica present in the mineral feed is effectively fluxed by the formation of the FeO and the resulting slag dissolves aluminum, calcium and magnesium oxides. Thus, the air/oxygen requirement is calculated on the basis of providing oxygen for combustion and for generation of a proportion of FeO, for example, to form $2FeO.SiO_2$ as a slag phase. Efficient separation is possible between iron and zinc by this method.

According to the invention the zinc sulphide vapour or the zinc and sulphur as separate atomic species reporting to the gas phase may be subsequently oxidized to sulphur dioxide and zinc oxide by the addition of air.

The substantial heat value of the reactions can be recovered in waste heat recovery equipment at this point. One advantage of the process provided by the present invention is that the sulphur emission control equipment is minimized especially for systems where the iron matte by-product from the furnace has no special value since only 70–80% of the sulphur present in the feed system is oxidized to sulphur dioxide. This reduces the sulphur dioxide recovery system compared with an equivalent roasting process.

If copper is present in the feed in addition to the iron sulphide and zinc, a copper matte can be made in the furnace. The deportment of copper to the fume is small compared to the matte phase and therefore leads to a very low copper content of the zinc oxide. This copper matte tends to retain precious metals such as gold and silver, which may later be recovered from this fraction.

The present invention also provides an alternative process route for fine particulate feed material which utilizes flash reactions in the freeboard (above the melt). In part, zinc is vapourised through the supply of part of the oxygen required for the combustion of the zinc sulphide according to:

$$ZnS + O_2 = Zn \text{ (vapour)} + SO_2$$

The provision of a carrier gas with controlled oxygen content is needed to bring oxygen into contact with the zinc sulphide particles and to strip and transport the product zinc vapour away from the particle surface, thereby ensuring that zinc oxide does not form primarily on the particles themselves; rather zinc vapour may be combusted to oxide in a separate afterburner further down the duct system. Another function of the carrier gas is to provide heat to raise the temperature of the particulate materials to the temperature where the reaction above readily occurs.

An additional part of the zinc is vapourized directly from the zinc sulphide particles according to:

$$2ZnS = 2Zn \text{ (vapour)} + S_2$$

or $$ZnS = ZnS \text{ (vapour)}$$

Zinc vapourization by these reactions does not require the supply of oxygen to the particles, but does require a sufficient volume of carrier gas to transport the vapour products away from the reaction zones.

It is necessary also to provide a carrier gas for stripping the molten bath in order to scavenge incompletely reacted zinc or zinc sulphide in the matte phase according to:

$$ZnS \text{ (dissolved in matte)} = ZnS \text{ (vapour)}$$

or $$2ZnS \text{ (dissolved in matte)} = 2Zn \text{ (vapour)} + S_2$$

The extent of completion of flash reactions is a function of particle size and residence time in the freeboard. The presence of iron which remains as a liquid iron sulphide and falls to the bath limits this completion process. Thus either some fuel and air/oxygen or a specifically introduced carrier gas added to the bath may act as a carrier gas.

For the flash reaction process route, fuel or other energy input is required to maintain the melt temperature within the defined operating regime at 1250° to 1400° C. If inadequate radiative transfer from the flame to the bath is achieved, then additional heat must be added directly to the melt by submerged combustion, by an electric source, or by a separate heat source above the melt.

Once zinc vapour and sulphur vapour or zinc sulphide vapour leave the bath, oxidation may be carried out to convert zinc sulphide to the oxide and sulphur dioxide. This may be accomplished in a second stage chamber or the freeboard of the same furnace or in an independent reaction zone in which the air addition is controlled. The choice is dependent on the engineering requirements and on the need to prevent the back-mixing of oxygen and air from the oxidation zone to the fuming zone of the furnace. The quantity of air to be added may be calculated directly from the stoichiometry of the reaction for formation of sulphur dioxide and zinc oxide as end-products. Some additional air may be necessary to limit the ultimate temperature of the combustion process prior to conditioning and cooling of the gas for capture of the zinc oxide product.

The thermodynamics for this system indicate that partial pressures of oxygen in excess of 0.1 bar and temperatures below 950° C. would favour the formation of zinc sulphate which is undesirable if the end product is to have minimal sulphur content, and which frequently leads to dust handling problems or gas duct blockages. Thus, for maximizing formation of zinc oxide rather than sulphate, it is preferable to add only sufficient air to stay in excess of the oxidation requirements for the reaction to avoid lowering the gas temperature below 950° C. From this temperature rapid quenching using a waste heat boiler, water sprays or an indirect heat exchanger prior to the particulate capture equipment avoids any significant sulphation of the product.

BRIEF DESCRIPTION OF THE DRAWINGS

Preferred embodiments of the invention will now be further described in relation to the drawings.

In the drawings.

DETAILED DESCRIPTION OF PREFERRED EMBODIMENTS

Figure 1:
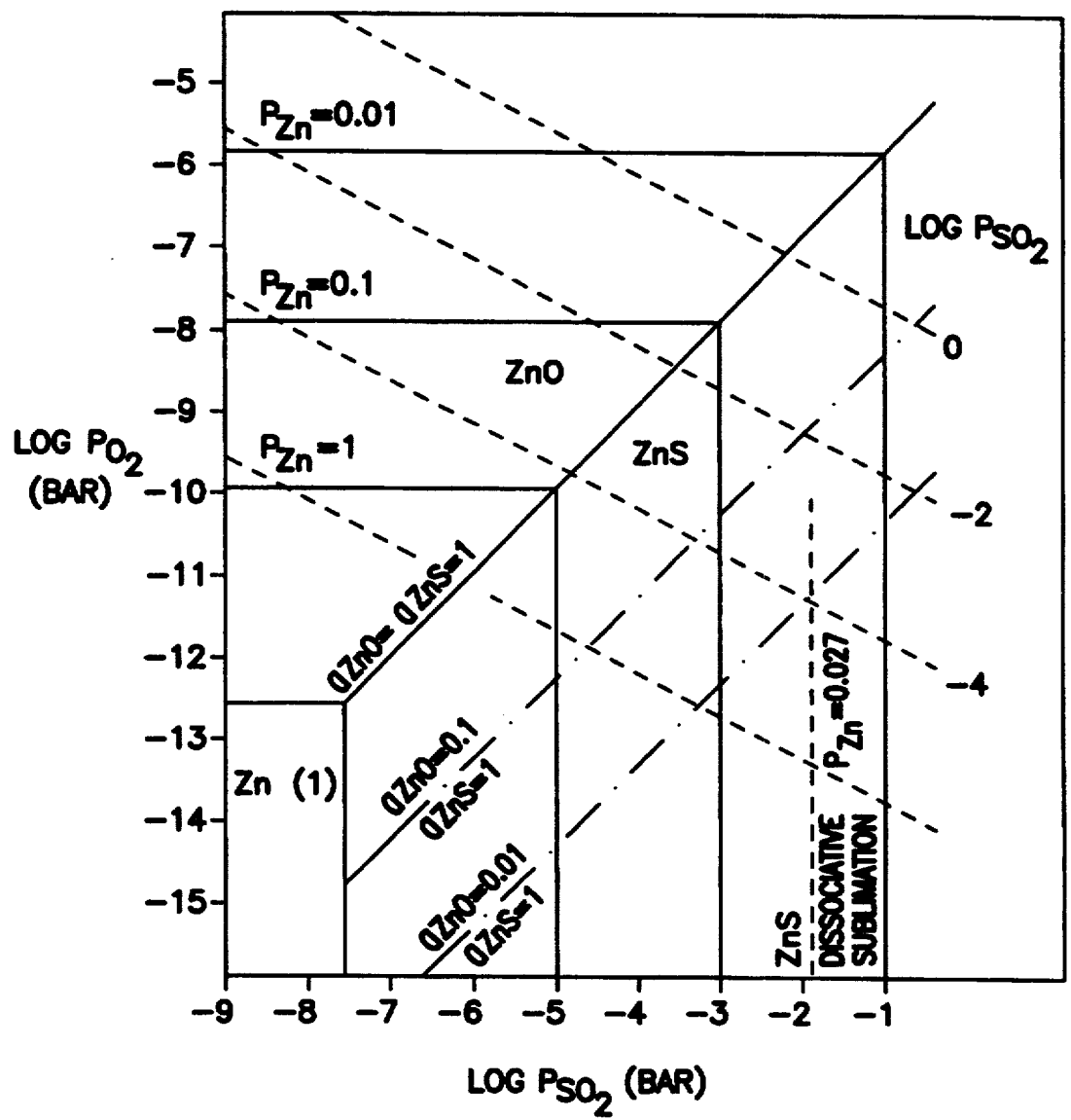
FIG. 1 is a diagrammatic representation of the thermodynamic basis for formation of zinc vapour, zinc oxide and zinc sulphide at 1300° C.
Figure 2:
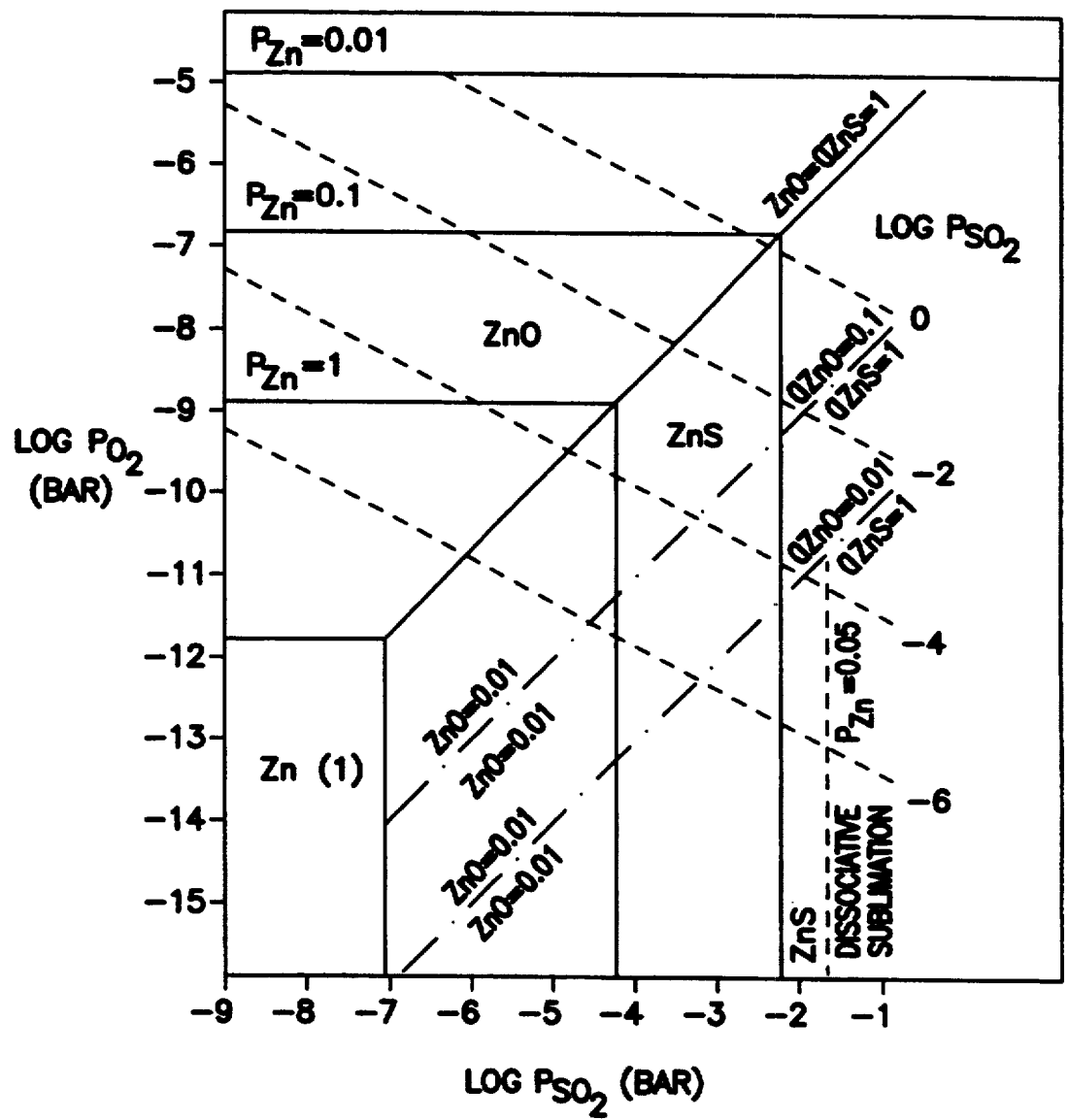
FIG. 2 is a diagrammatic representation of the thermodynamic basis for formation of zinc vapour, zinc oxide and zinc sulphide at 1350° C.

The method provided by the invention may take advantage of the vapour transport or stripping of zinc vapour and sulphur vapour by the combustion products. Thus the combustion products may act as a carrier gas. FIGS. 1 and 2 show predominance diagrams depicting the thermodynamic basis for formation of zinc vapour, zinc oxide and zinc sulphide at 1300° C. and 1350° C. Assuming separate zinc and sulphur species, the rate of fuming of zinc sulphide from the bath is a function of the partial pressure of zinc vapour at the operating temperature and the approach to equilibrium achieved in the carrier gas.

For the preferred operating conditions, e.g. partial pressure of oxygen approximately $10^{-8}$ bar, it may be seen from the diagrams that the partial pressure of zinc vapour at this condition is approximately 0.1 bar and is significantly raised by an increase in temperature. The product of the partial pressure and the molar flowrate of gas gives the fuming rate. The fuming rate is also affected by the local temperature at the gas bubble-melt interface and the interfacial area.

The volatization of zinc by an oxidation mechanism requires a controlled amount of oxygen to be supplied to the zinc sulphide, thereby achieving a high vapour pressure of zinc.

Concurrent with the oxidative volatization of zinc direct sublimation occurs according to:

$$ZnS = ZnS \text{ (vapour)}$$

or dissociative sublimation, according to:

$$2ZnS = 2Zn \text{ (vapour)} + S_2$$

The mechanism of oxidation-vapourization and sublimation commence during the period when particulate or consolidated materials (such as pellets) containing zinc sulphide contact hot gases in the freeboard of the furnace. Upon contact with the furnace bath of intimately mixed slag and matte the partly reacted feed materials continue to react and produce zinc vapour.

One essential condition for rapid evolution of zinc vapour is a high heat flux into the feed material to raise the temperature preferably to approximately 1300° C. at which the equilibrium vapour pressure of zinc is approximately 0.1 bar and to continue providing heat to sustain the endothermic reactions which produce zinc vapour. A high rate of heat transfer is strongly promoted by the contact of feed with an agitated slag and matte bath which acts as a convective heat transfer medium. Agitation of the bath by, for example a tuyere or lance intimately mixes the matte and slag phases and exposes feed particles to oxygen-containing or inert gas and provides continual contact and renewal of carrier gas to transport product zinc vapour away from the reacting particles.

Slag formation provides a medium for the removal of iron and some impurities from the feed material.

The third mechanism by which zinc is recovered is the stripping action of a carrier gas contacting zinc sulphide dissolved in the matte phase. It is clear that the approach to equilibrium of zinc dissolved in the matte phase with the carrier gas is favoured by any method where good mass transfer between gas and liquid melt is achieved. This, therefore, favours processes using lances or tuyeres in submerged mode where combustion products and melt plus feed material are intimately contacted.

The presence of a liquid matte containing iron sulphide is essential to control and limit the accumulation of zinc oxide in the slag phase. At the matte-slag interface, the oxygen potential is set by the compositions of the two liquid phases and remains relatively constant during the progress of smelting as long as both matte and slag phases are present. The slag cleaning action of matte is enhanced by the same conditions which promote evolution of zinc vapour, that is intimate mixing of the matte and slag which may be achieved through a high degree of agitation to form a high interfacial contact area. It follows therefore that while both matte and slag phases are present they are intermixed in a form of slag/matte emulsion and are not present during operation of processes according to the invention as separate layers with a slag bath overlaying a molten matte.

For product impurity control where ZnO is the desired end-product, it is preferable to minimize the entrainment of feed material, matte or slag from the furnace into the offgas. Maintenance of an adequate operating temperature and minimization of the mass flow rate to limit entrainment are both favoured by the use of oxygen enrichment in the process. It is believed that an oxygen enrichment in air of 40% v/v (i.e. $O_2/(O_2+N_2)=0.4$) or above is an economic break point for the process.

Figure 3:
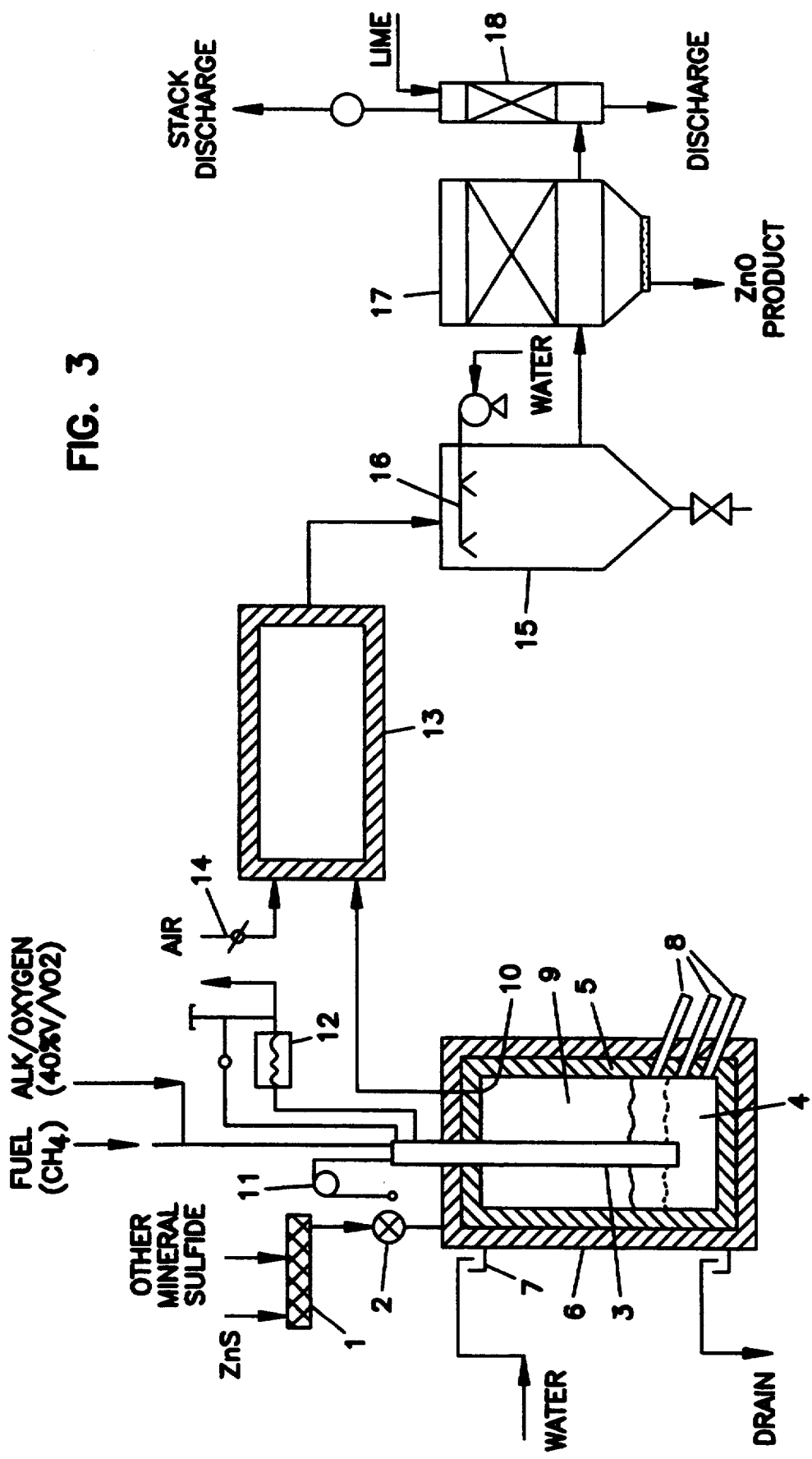
FIG. 3 is a flow-sheet for a process according to one preferred embodiment of the present invention.

A typical process is depicted in FIG. 3 where the following items are noted:

Feed is introduced into the reactor directly through a screw conveyor (1). Means to prevent uncontrolled ingress of air with an airlock or double flap-valve (2) is provided at this point. A lance (3) is provided for injection of a combustion mixture—in this instance, natural gas (methane) and oxygen enriched air (40% v/v oxygen) beneath the melt (4) in a submerged mode. The reactor itself has a chrome magnesite or similar lining (5) with backup insulation material (6). It is water cooled (7) in the reaction zone. Apertures (8) are provided for tapping slag and matte from the system or emptying the reactor at the end of a campaign. The combustion freeboard (9) provides adequate space for disengagement of any splashes of liquid slag or matte created by the action of the lance before the gases leave the exhaust port (10). A mechanism (11) is provided for advancing and retracting the lance into and from the melt so that the contacting may be adjusted.

In this instance an indirect cooling circuit (12) is provided for the lance so it may be operated under a wide range of fuel/air/oxygen inputs to suit the requirements of the process. Other types of lance are possible including direct air-cooled or refractory-coated or tuyeres passing through the side walls or even the base of the reactor. The details of these are not important to the principle of the process. The exhaust gas leaving the reactor passes into a post-combustion chamber (13). Air is added through duct (14) for completion of the reaction and partial quenching of the gas. At this point, zinc sulphide or zinc metal vapour and sulphur are converted to zinc oxide and sulphur dioxide. The exhaust gas can be treated in a number of ways to cool and condition and collect the product zinc oxide, always having regard to the oxygen partial pressure, temperature and residence time requirements to minimize formation of sulphate (if this is undesirable in the subsequent processing).

Also shown in the FIG. 3, are a quench chamber (15) utilizing water sprays (16) to cool the gases to 220° C. prior to capture of the zinc oxide in a bag filter (17). The exhaust gas from the bag filter can then be passed to a scrubbing system (18) for removal of sulphur dioxide with any of the conventional scrubbing agents such as lime or sodium hydroxide. If the economics are favourable, the gas can be sent through an acid plant for sulphuric acid recovery. Alternative methods of waste heat recovery are possible (not shown) which would include a waste heat boiler or other forms of indirect heat exchanger for heat recovery.

EXAMPLES OF PREFERRED EMBODIMENTS

In one embodiment of the process, a feed material is used which is finely divided with a $P_{80}$ particle size of $-45$ microns and which comprises principally pyrrhotite and marmatite (FeS, ZnFeS) and some chalcopyrite ($CuFeS_2$). The approximate analysis is:

| Component | % |
|---|---|
| Zn | 40.41 |
| Sn (tot) | 0.16 |
| Sn (sol) | 0.14 |
| Ag | 132 g/t |
| Fe | 20.0 |
| Cu | 0.51 |
| Pb | 0.10 |
| In | 300 g/t |
| S | 31.87 |
| $SiO_2$ | 6.8 |

Operating at 1600K (1327° C.), it is possible to produce a fume having an analysis of:

| Component | % |
|---|---|
| Zn | 76.6 |
| Sn | .3 |
| Pb | .2 |
| Cu | <0.1 |
| Ag | 56 |

This material, at 95.3% ZnO, is only approximately 4% less than rubber grade zinc oxide and needs very little hydrometallurgical refining to upgrade it.

The analysis of matte produced is:

| Fe | 49.8% |
|---|---|
| Cu | 3.1 |
| Zn | 13.6 |
| S | 33.5 |

The slag analysis is:

| FeO | 63.3% |
|---|---|
| Zn | 9.3 |
| $SiO_2$ | 27.4 |

The production per 1000 kg of feed is approximately:
470 kg of fume
240 kg of slag
160 kg of matte Overall, the distribution of metals and sulphur in the process are approximately as shown below in Table 1.

TABLE I

DISTRIBUTION OF COMPONENTS TO THE VARIOUS FRACTIONS

| | GAS | SLAG | MATTE | FUME |
|---|---|---|---|---|
| Zn | | 6 | 5 | 89 | — |
| Fe | | 59 | 40 | 1 | — |
| Cu | | 4 | 96 | tr | — |
| Pb | | tr | 1 | 99 | — |
| In | | — | 10 | 90 | — |
| Sn | | 1 | tr | 99 | — |
| Ag | | — | 80 | 20 | — |
| $SiO_2$ | | 98 | 1 | 1 | — |
| $Al_2O_3$ | | 100 | — | — | — |
| MgO | | 100 | — | — | — |

TABLE I-continued

| DISTRIBUTION OF COMPONENTS TO THE VARIOUS FRACTIONS | | | |
|---|---|---|---|
| GAS | SLAG | MATTE | FUME |
| S | 1 | 17 | tr | 82 | tr = trace

The 81% of the sulphur in the feed which is fumed and converted to sulphur dioxide may be recovered as sulphuric acid.

The process condition required in the reactor itself is a reducing gas phase which can be achieved by providing approximately 90% of the stoichiometric air/oxygen for complete combustion of fuel and chemical reaction. The fuel input required is based on providing adequate heat energy to maintain the melt at approximately 1300° C. With 40% v/v oxygen in the air the fuel consumption corresponds to approximately 134 kg of methane ($CH_4$) per 1,000 kg of feed, at the above assay, containing 10% moisture. Comparing this with the zinc fuming from slags, where zinc is present as its oxide, approximately 1,500 to 2,000 kg of $CH_4$ (or coke) per tonne of zinc formed are required. In contrast, the figure for fuel required for the new process according to this invention is 420 kg per tonne of zinc produced as zinc oxide.

From the above it can be seen that little iron or copper report to the fumed zinc product. In addition, once the zinc sulphide is oxidized to ZnO approximately 520 kg of $SO_2$ per tonne of feed are produced, unlike roasting of zinc sulphide materials which would produce approximately 600 kg of $SO_2$ per tonne of feed. Thus the lime scrubbing or acid plant capacity are somewhat reduced compared with requirements for a roasting process.

In the example given, no fluxing reagents are required—sufficient of the pyrrohtite is oxidized to FeO to form a fayalitic slag. The presence of an iron matte intimately mixed with the slag assures good fluidity characteristics. Thus the normal fluxes associated with smelting or for fuming a fluid slag with high ZnO content are obviated.

In another example of the invention, it is possible to take a sulphur bearing material such as a pyrite or chalcopyrite (i.e. either an iron or copper matte based system) and introduce secondary materials such as electric arc furnace dust (which are hazardous waste according to the EPA standards) and use this process for efficient separation of the zinc from the copper and iron content. The oxidized nature of such flue dust requires some additional reductant in order to assure that zinc oxide is first reduced to zinc vapour. A large proportion of the reducing power required can be provided by the sulphur content in the pyrite or chalcopyrite which is simultaneously fed to the reactor. Any lead, cadmium or tin present in the feed will however, also fume from the reactor quantitatively.

A number of other applications are possible for the process. For example, mixed zinc slags, zinc bearing flue dusts, zinc copper concentrates and zinc lead concentrates. A sulphidizing environment must be provided either through pyrite or from the sulphur present in the feed and the oxygen partial pressure of the molten mass must be maintained in the region of $10^{-7}$ to $10^{-11}$ bar. The process is then able to effect a separation of zinc, tin and lead which are preferentially fumed at high recovery from copper and iron which are maintained in a matte phase or, in the case of iron, also in the slag. For reject materials such as jarosite or plumbojarosite, where there is both high lead and zinc present as well as iron, silver may be recovered partly to a matte phase and partly to fume depending on the conditions and a fayalitic slag largely devoid of precious metals may also be produced. Similarly, any gold present in the jarosite is recovered to a high iron or copper matte and following separation outside the furnace or with the furnace operated on a batch basis to settle the two phases, matte may be removed to recover gold, silver and copper if these are present in the feed material.

Another application of the process is the treatment of zinc-lead feed materials containing iron and optionally copper such as concentrates and flue dusts to effect a separation of a mixed zinc-lead oxide fume product from iron and copper. Alternatively, the products of this operation may be lead bullion and/or lead containing matte and zinc oxide rich slag, as well as mixed zinc-lead oxide fume.

While it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the scope and ambit of the present invention.

We claim:

1. A process for the treatment in a reaction vessel of a feed material, said feed material containing zinc sulphide or other zinc bearing material and an iron sulphide containing material or compound, to effect a separation of zinc from iron, the process comprising fuming either zinc or sulphur vapor or zinc sulphide vapor in the vessel, said fuming comprising contacting either or both of the feed material and a bath of liquid matte formed from an intimate mixture containing at least iron sulphide and a slag phase and any dissolved zinc sulphide, with an oxygen-containing carrier gas, whereby the vapor is stripped from the feed material and/or the liquid matte and transported by the carrier gas for further refining, the process being operated at a temperature in the region of 1250° C. to 1400° C. and at a partial pressure of oxygen in the region of $10^{-7}$ to $10^{-11}$ bar.

2. A process according to claim 1, wherein said intimate mixture is obtained by agitation of the bath, and selecting the flow rate of the carrier gas to the reaction vessel to be sufficient to impart a high degree of mixing of the bath and to transport zinc vapor and sulphur and sulphur oxides from the reaction vessel for said further refining.

3. A process according to claim 1, wherein the amount of sulphur as sulphide in the feed material fed to the reaction vessel is sufficient to substantially prevent oxidizing conditions in the reaction vessel.

4. A process according to claim 1, wherein said carrier gas comprises combustion products.

5. A process according to claim 2, wherein said carrier gas comprises combustion products.

6. A process according to claim 1, wherein the partial pressure of oxygen is in the region of $10^{-8}$ bar.

7. A process according to claim 1, wherein the partial pressure of oxygen is in the region of $10^{-9}$ bar.

8. A process according to claim 1, wherein the temperature of the process is maintained in the region of 1300° C. to 1350° C.

9. A process according to claim 1, wherein said bath of liquid matte is contained in a vertical cylindrical vessel, and wherein the feed material is fed to the freeboard of the bath and the carrier gas through a lance in submerged mode to maintain a high degree of mixing of the bath.

10. A process according to claim 2, wherein said bath is contained in a vertical cylindrical vessel, and further comprising feeding the feed material to the bath and introducing the carrier gas through a lance in submerged mode to maintain a high degree of mixing of the bath.

11. A process according to claim 3, wherein the reaction vessel comprises a refractory lined vessel selected from a combustion fired furnace, an electric arc furnace, a plasma furnace, a converter or other refractory lined chamber, in which the temperature is maintained either by the input of electrical energy, or combustion of fossil fuels and/or waste material sparging the molten phase using either a top feed lance, bottom or side mounted porous plugs, tuyeres or nozzles to introduce a reducing gas mixture or products of combustion of air, oxygen and fuel, and further comprising means for introducing the feed material either into the freeboard of the bath or directly into the bath by injection in submerged mode.

12. A process according to claim 1, wherein the feed material is a combined sulphide of zinc and iron or zinc and copper selected from zinc ferrite, marmatite, calamine, chalcocite or chalcopyrite in which air and oxygen with a combined content of at least 35% oxygen is employed for combustion and conversion of a proportion of the iron content.

13. A process according to claim 1, wherein the feed material is an electric arc furnace or other flue-dust having a high zinc content which is fed to the reaction vessel with a sulphur bearing material such as pyrite or chalcopyrite to provide a liquid matte bath with or without a content of hydrocarbon material.

14. A process according to claim 9, further comprising oxidizing exhaust gas from the bath containing zinc and sulphur as vapor or zinc sulphide vapor by the addition of air or other source of oxygen to produce zinc oxide, wherein the partial pressure of oxygen during oxidation is less than 0.1 bar and oxidation is carried out at above 950° C., and wherein oxidation takes place in a vessel which is either integral with said reaction vessel or a separate post-combustion chamber from which the exhaust gas is rapidly quenched by water spray cooling, a waste heat boiler or heat exchanger to minimize the formation of sulphate within the zinc oxide product.

15. A process according to claim 1, wherein the feed material is essentially self-fluxing by virtue of a partial conversion of a proportion of the iron in the feed material to iron oxide which acts as a flux when combined with CaO or $SiO_2$ or a combination of these and which takes advantage of an intermixing of the high fluidity of iron or copper matte for its fluidity or in which fluxing components such as CaO are added as necessary to improve the physical and chemical properties of the slag phase.

16. A method comprising feeding a zinc oxide or zinc sulphide gearing material and including some iron sulphide to and partially oxidizing said material in the freeboard of a reaction vessel by air and/or oxygen in substoichiometric ratio to form a matte bath, comprising sparging said matte bath by a carrier gas injected froth above by a lance or through tuyeres or nozzles, and zinc and sulphur vapor or zinc sulphide vapor leave the reaction zone and matte bath in the total gas flow, wherein the matte bath temperature is in the region of 1250°–1400° C. and the partial pressure of oxygen in the matte bath is in the region of $10^{-8}$–$10^{-12}$ bar.

17. A process for the treatment of a feed material comprising a zinc sulphide-bearing mineral and an iron sulphide mineral to form a molten matte from which zinc sulphide either as zinc and sulphur vapor or a zinc sulphide vapor is fumed directly, comprising contacting said feed material with an oxygen-containing carrier gas, wherein the process is operated at a temperature in the region of 1250° to 1400° C. and at a partial pressure of oxygen in the region of $10^{-8}$ to $10^{-12}$ bar, and wherein the molten matte is intimately mixed in a bath with a slag phase.

18. A process according to claim 17, wherein the partial pressure of oxygen in the bath is in the region of $10^{-8}$ bar.

19. A process according to claim 17, wherein the partial pressure of oxygen in the bath is in the region of $10^{-9}$ bar.

20. A process according to claim 17, wherein said temperature is about 1300° C.

21. A process according to claim 17, wherein the oxygen-containing carrier gas comprises the combustion products of a fuel and an oxidizing gas comprising an oxygen/air mixture having an oxygen content of at least 35% $O_2$.

22. A process according to claim 17, wherein the oxygen-containing carrier gas comprises the combustion products of a fuel and an oxidizing gas comprising an oxygen/air mixture having an oxygen content of at least 40% $O_2$.

23. A process according to claim 17, wherein contacting the oxygen-containing carrier gas comprises introducing the carrier gas below the surface of the bath.

24. A process according to claim 17, wherein the molten bath of slag and matte is contained in a vertical cylindrical vessel into which the feed material is fed into the freeboard of the bath and gases are introduced through a lance in submerged mode to maintain a high degree of mixing of the molten bath.

25. A process according to claim 17, wherein said process is carried out in a reaction vessel which comprises a refractory lined vessel selected from a combustion fired furnace, an electric arc furnace, a plasma furnace, a converter or other refractory lined chamber in which the temperature can be maintained either by the input of electrical energy or combustion of fossil fuels and/or waste materials sparging the molten phase using either a top feed lance, bottom or side mounted porous plugs, tuyeres or nozzles using a gas mixture or products of combustion of air, oxygen and fuel, and a means for introducing the feed either into the freeboard of the vessel or direct into the bath or by injection in submerged mode.

26. A process according to claim 17, wherein the oxygen containing carrier gas oxidize used to the fumed product is air or other source of oxygen to produce zinc oxide.

27. A process according to claim 26, wherein during oxidizing of the fumed product the partial pressure of oxygen is limited to less than 0.1 bar and oxidation is carded out at above 1000° C. and wherein oxidation takes place in a vessel which is either integral with the fuming vessel or a separate post-combustion chamber from which the exhaust gases are rapidly quenched by water spray cooling, a waste heat boiler or heat exchanger to minimize the formation of sulphate within the zinc oxide product.

28. A process according to claim 26, wherein the partial pressure of oxygen is in the region of $10^{-9}$ bar.

29. A process according to claim 27, further comprising separating the zinc from the fume by oxidation of the fume through the addition of air or other source of oxygen to produce zinc oxide in which process the partial pressure of oxygen during oxidation is limited to less than 0.1 bar and the temperature of oxidation is above 1000° C.

30. A process for the treatment of a zinc sulphide containing feed material to effect a separation of zinc from iron, said process comprising fuming zinc and sulfur vapor or zinc sulfide vapor from a molten bath containing iron sulfide, said molten bath comprising an intimate mixture of matte and slag at a temperature of approximately 1300° C. and at a partial pressure of oxygen in the region of $10^{-8}$ bar, and further comprising stripping and transporting the fume by a carrier gas and separating zinc from the fume.

* * * * *